US010821509B2

(12) United States Patent
Manteiga et al.

(10) Patent No.: US 10,821,509 B2
(45) Date of Patent: Nov. 3, 2020

(54) ADDITIVE HEAT EXCHANGER MIXING CHAMBERS

(71) Applicant: GENERAL ELECTRIC COMPANY, Schenectady, NY (US)

(72) Inventors: John Alan Manteiga, Lynn, MA (US); Michael Thomas Kenworthy, Beavercreek, OH (US); Jared Matthew Wolfe, Cincinnati, OH (US); Thomas Kupiszewski, Liberty Township, OH (US); Jeffrey Douglas Rambo, West Chester, OH (US); James Fitzgerald Bonar, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 8 days.

(21) Appl. No.: 15/001,914

(22) Filed: Jan. 20, 2016

(65) Prior Publication Data

US 2017/0205145 A1 Jul. 20, 2017

(51) Int. Cl.
| | | |
|---|---|---|
| *B22F 3/105* | (2006.01) | |
| *F28F 7/02* | (2006.01) | |
| *F28F 9/26* | (2006.01) | |
| *F28F 13/06* | (2006.01) | |
| *F28D 7/16* | (2006.01) | |
| *B33Y 80/00* | (2015.01) | |

(52) U.S. Cl.
CPC ............ *B22F 3/1055* (2013.01); *B33Y 80/00* (2014.12); *F28D 7/1638* (2013.01); *F28F 7/02* (2013.01); *F28F 9/26* (2013.01); *F28F 13/06* (2013.01)

(58) Field of Classification Search
CPC ... F28D 7/1638; F28F 7/02; F28F 9/26; F28F 13/06
See application file for complete search history.

(56) References Cited

U.S. PATENT DOCUMENTS

| | | | |
|---|---|---|---|
| 3,161,234 A | 12/1964 | Rannenberg | |
| 4,328,860 A | 5/1982 | Hoffmüller | |
| 4,815,532 A * | 3/1989 | Sasaki | F28D 1/0333 165/152 |
| 6,474,408 B1 | 11/2002 | Yeh et al. | |
| 7,650,935 B2 * | 1/2010 | Demuth | F28D 1/0478 165/176 |
| 8,353,330 B2 * | 1/2013 | Lim | B23P 15/26 165/176 |
| 2003/0159807 A1 | 8/2003 | Ayres et al. | |
| 2009/0260786 A1 * | 10/2009 | Palanchon | F28D 9/0031 165/176 |
| 2010/0077794 A1 * | 4/2010 | Higashiyama | F25B 39/022 62/515 |
| 2011/0180242 A1 * | 7/2011 | Urata | F28D 9/0068 165/166 |

(Continued)

FOREIGN PATENT DOCUMENTS

EP 2811249 A1 5/2014

*Primary Examiner* — Gordon A Jones
(74) *Attorney, Agent, or Firm* — Dority & Manning, P.A.

(57) ABSTRACT

A heat exchanger is provided having an integrally and seamlessly formed return manifold connecting multiple supply tubes and return tubes. The heat exchanger may also include a return manifold having one or more structures providing a flow restriction within or proximate the return manifold.

19 Claims, 4 Drawing Sheets

(56) References Cited

U.S. PATENT DOCUMENTS

2012/0180478 A1\* 7/2012 Johnson .................... F02D 9/02
 60/605.2
2012/0312502 A1  12/2012 Metni et al.
2015/0101334 A1   4/2015 Bond et al.
2019/0120562 A1\* 4/2019 Fuller ..................... F28F 1/422

\* cited by examiner

ADDITIVE HEAT EXCHANGER MIXING CHAMBERS

This invention relates to heat exchangers and novel heat exchanger designs that include a return manifold and allow for improved heat exchange capabilities.

BACKGROUND

Heat exchangers are useful in a variety of industrial application from chemical processing to engine components. High temperature heat exchange applications for aircraft engines may result in excess of 1000° F. temperature differences across walls, resulting in severe thermal stresses that must be alleviated for the component to possess sufficient low-cycle fatigue strength to survive thermal cycling.

Heat exchangers are typically assembled so that the tube-manifold interface requires a brazed or welded joint and the return tubes require similar features to secure to the tube bank shell. Thermal compliance features are ineffective in an assembled component due to the stress concentrations and low fatigue strength at the brazed/welded joints between the tube manifold. Moreover, traditional heat exchangers experience 10% or more variation in flow among the different tubes because space, weight and/or pressure drop constraints often limit the amount of flow spreading below the required amount to create uniformly-distributed flow. In addition, the traditional u-bend geometries limit the heat exchanger design to specific tube pitch and tube count within the shell structure.

A need exists for heat exchangers having integrally manufactured return headers and tube manifold interfaces to meet thermal stress and low cycle fatigue requirements encountered in aircraft engines, and allow for more uniform flow and heat exchange characteristic throughout the heat exchanger. In addition, a need exists for manufacturing techniques that allow flexibility in heat exchanger design of the tube pitch and count along the shell flow of the heat exchanger.

BRIEF DESCRIPTION OF THE INVENTION

The present invention relates to multi-pass tubular heat exchangers having integral return headers that provide a thermal mixing chamber to redistribute the flow among the incoming tubes, significantly diminishing the negative thermal performance impact associated with flow mal-distribution while simultaneously increasing total heat transfer rate from the internal impinging flow. Integral return headers enable varying tube counts and pitches per tube row or tube pass while also allowing for the inclusion of mechanical compliance features to attenuate thermal stress at critical locations between the tubes and the heat exchanger body.

The heat exchangers of the present invention comprise an outer shell portion, at least two first supply tubes within the outer shell portion; at least two first return tubes within the outer shell portion; and a return manifold integrally and seamlessly formed with the first supply and first return tubes that allows fluid from at least two first supply tubes to mix before flowing into the first return tubes. The integral and seamless connection between the return manifold and tubes can be easily accomplished using additive manufacturing techniques such as a direct metal laser melting. These connections are superior to welded joints that introduce weak points into the structure of the heat exchanger.

In one embodiment, the heat exchanger further comprises a second bank of tubes within the shell comprising at least two second supply tubes and at least two second return tubes, and a second return manifold integrally formed with the second supply and second return tubes that allows fluid from at least two second supply tubes to mix before flowing into the second return tubes. The second bank of tubes may have a different number of tubes the first bank of tubes. In addition, the pitch or distance between the tubes may differ from the first bank of tubes to the second bank of tubes.

In another aspect of the invention, the first supply tubes are tapered to be narrower at the interface with the return manifold. Alternatively, or in addition, the first return tubes are tapered to be wider at the interface with the return manifold. In another aspect of the invention, at least one fin structure is provided within the return header. Alternatively, or in addition, at least one ridge structure is provided within the return header. The return header may also have at least one lattice structure to aid with mixing and/or heat transfer within the return header. Alternatively, or in addition, the return header may be provided with two or more pin structures making up a pin bank within the return header.

In another aspect of the invention, a thermal expansion feature such as an omega-shaped hairpin feature or sliding feature is provided between the return header and the outer shell of the heat exchanger (in the case where the return header does not form part of the outer shell of the heat exchanger).

Another aspect of the invention is its method of making using additive manufacturing techniques. The method includes the steps of integrally forming an outer shell portion, at least two first supply tubes, at least two first return tubes, and at least one return manifold using an additive manufacturing technique. According to these methods the return manifold can form a portion of the outer shell portion of the heat exchanger or it can be placed within the outer shell of the heat exchanger. The additive manufacturing technique can be any known technique. In one embodiment, the additive manufacturing technique is direct metal laser sintering.

In another embodiment, the heat exchanger comprises an outer shell portion; at least two first supply tubes within the outer shell portion; at least two first return tubes within the outer shell portion; and a return manifold formed with the first supply and first return tubes that allows fluid from at least two first supply tubes to mix before flowing into the first return tubes, wherein the heat exchanger includes a flow restriction within or proximate to the return manifold. The flow restriction can be introduced in a number of ways. In one preferred aspect, the flow restrictions are formed integrally and seamlessly formed with the tubes using an additive manufacturing technique.

DETAILED DESCRIPTION OF THE INVENTION

The following detailed description sets forth heat exchangers whose manufacture is enabled by additive manufacturing techniques by way of example and not by way of limitation. The description should clearly enable one of ordinary skill in the art to make and use the heat exchangers, and the description sets forth several embodiment, adaptations, variations, alternatives, and uses of the heat exchangers, including what is presently believed to be the best mode thereof. It is contemplated that the heat exchangers and methods of fabricating the heat exchangers may have general application in a broad range of systems and/or a variety of commercial, industrial, and/or consumer applications.

The integrated heat exchanger of the present invention may be manufactured according to an additive printing technique, including selective laser sintering (SLS), direct metal laser sintering (DMLS) and three dimensional printing (3DP). The materials can include stainless steel, aluminum, titanium, Inconel 625, Inconel 718, cobalt chrome, among other metal materials. In addition, ceramics may be used for very high-temperature applications. In each of these powder based fabrication methods, powdered material is melted or sintered to form each part layer. For example, the SLS process utilizes powdered plastic materials that are selectively sintered by a laser layer-by-layer. Other types of additive manufacturing techniques include 3D printing including stereolithography (SLA), jetted photopolymer, or ink jet printing. Other types of additive printing include solid-based processes, which use non-powdered materials that are layered one on top of another and subsequently cut out. These methods includes laminated object manufacturing (LOM) or fused deposition modeling (FDM). Any of the above techniques may be utilized to form the integral heat exchangers of the present invention.

Figure 1:
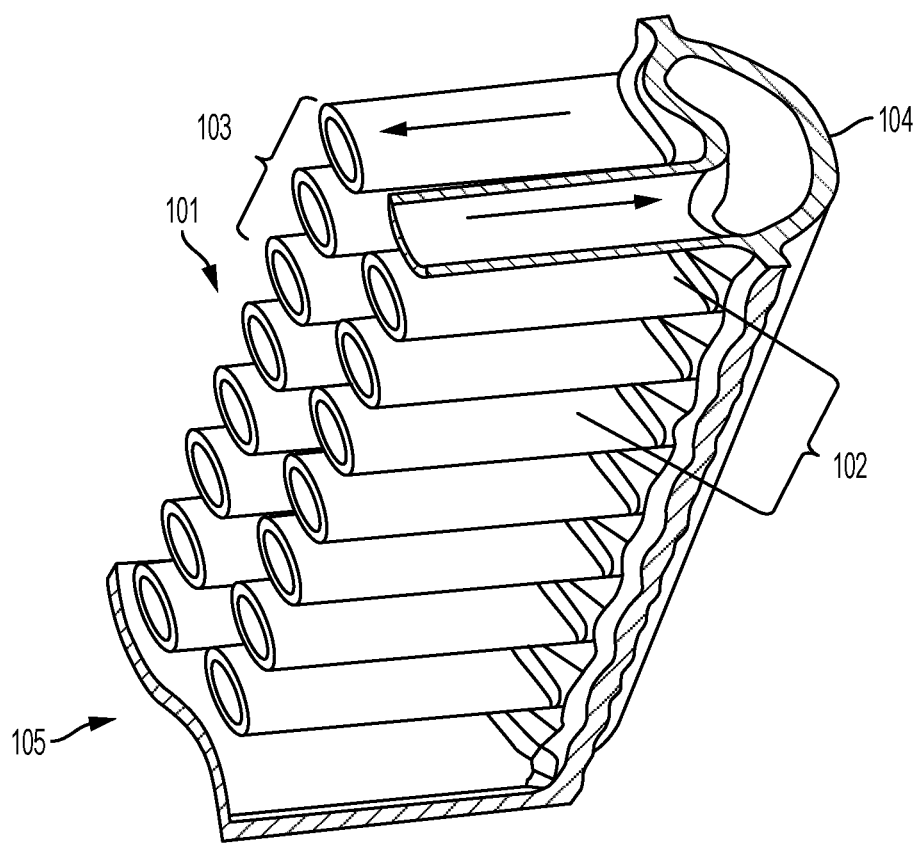
FIG. 1 is a cross-sectional view of an additive manufactured heat exchanger illustrating the shell flow over the tube bank and tube flow.

In one aspect, the present invention provides integrally formed mixing chambers 104 at each side of the tube bank 102, 103. FIG. 1. The supply tubes 102 and return tubes 103 are placed within a shell 101. The mixing chambers 104 homogenize flow resulting in a re-balancing of the flow among various supply tubes (102) thereby eliminating the negative thermal aspects associated with a flow mal-distribution. The space, weight and pressure drop constraints in conventional tube banks commonly experience a 10-20% variation in flow among the different tubes, which is eliminated through this aspect of the present invention. In addition, the dump and collection of the tube flow that results from the mixing chambers 104 results in a restart of the hydrodynamic and thermal boundary layers upon entering the downstream tubes and increases the local heat transfer rate relative to conventional u-bend geometries.

Figure 2:
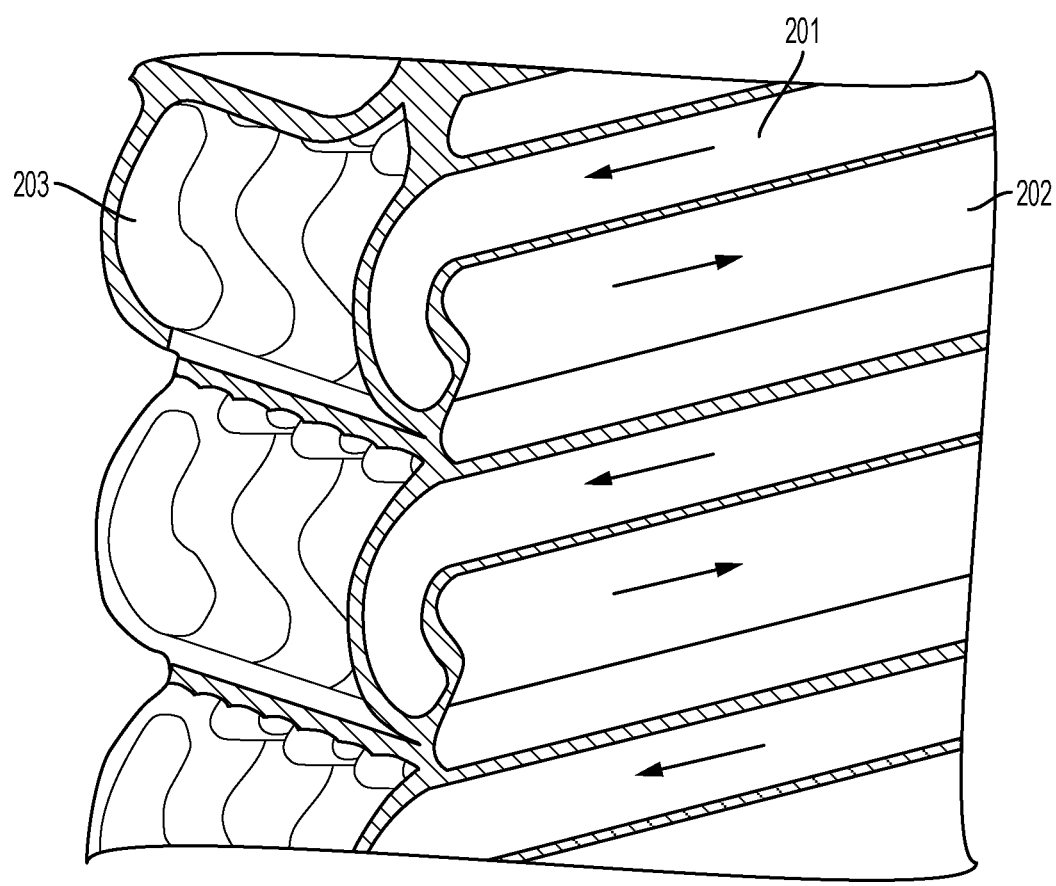
FIG. 2 is another cross-sectional view of an additive manufactured heat exchanger illustrating the return manifold.

The return manifold geometry also creates an enhanced heat transfer region as the tube flow 201, 202 impinges onto the curved manifold wall 203. FIG. 2. The outer wall 203 (farthest from the tune inlet/outlet regions may be internal to the shell volume or integrally form a portion of the shell wall, as illustrated in FIGS. 1 and 2. External surfaces of the return manifold may also include fins, dimples or other heat transfer-promoting features to increase the heat transfer rate to the environment when the manifold also serves as part of the shell wall or the shell flow stream when the manifold is located internal to the shell wall.

Figure 3:
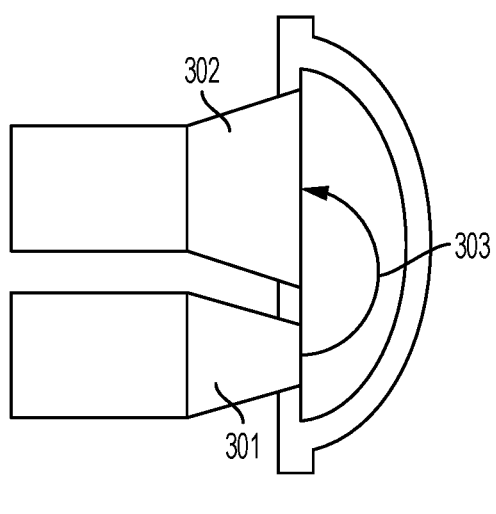
FIG. 3 is a schematic showing an embodiment of the invention having a tapered tube structure.

In another aspect of the invention, additional heat transfer augmentation is provided in the impingement region of the return manifold by providing tapered nozzle shapes 301 at the end of the supply tube row to further increase the jet Reynolds number of the fluid flow 303. FIG. 3. Alternatively, the jet Reynolds number may be increased by placing internal constrictions at the exhaust end of a non-tapered supply tube row. The exhaust tube row receiving the spent impingement air may have an enlarged bell-mouth shape 302 to minimize pressure losses associated with redistributing the flow among the downstream tube rows. Alternatively, the exhaust tube row receiving the spent impingement air may have both a bell-mouth shape and internal constrictions (e.g., pins) within the bell-mouth shape portion.

Figure 4:
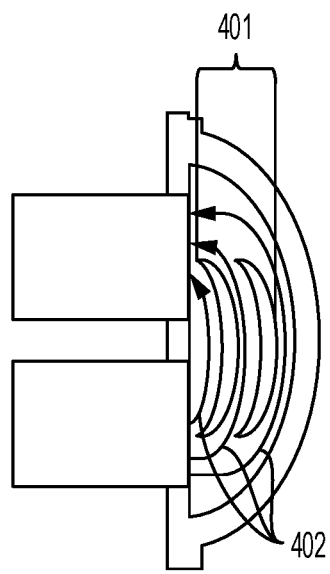
FIG. 4 is a schematic showing an embodiment of the invention having a turning vane structure within the return manifold.
Figure 5:
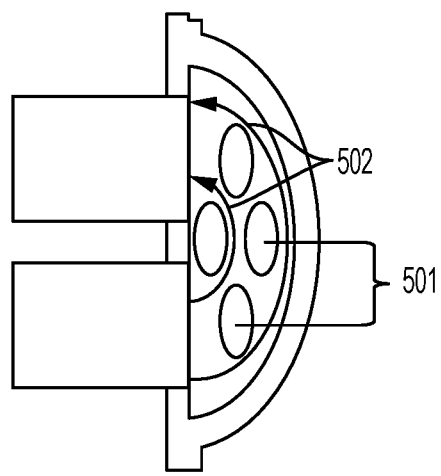
FIG. 5 is a schematic showing an embodiment of the invention having a pin bank structure within the return manifold.

In another aspect of the invention, fins or ridges 401 are added to the concave surface of the return manifold to serve as both turning vanes and extended heat transfer surfaces to alter the fluid flow 402. FIG. 4. Alternatively, or in addition, additional heat transfer may be obtained in the return manifolds by mounting a pin bank 501 in the return manifold that alters fluid flow 502 within the return manifold. FIG. 5. As noted above, a similar pin bank may be provided in the untapered supply tube row. Additional lattice-type structure in communication within the return manifold outer wall may be used to provide additional heat transfer area and potentially accelerate the flow through the return manifold to increase the heat transfer coefficient.

The heat exchangers of the present invention may flow either the hot or cold stream inside the tubes. In either case, the tube-containing fluid experiences a reduction in temperature and improves the overall HX performance. When the hot stream is flowing internal to the tube bank, additional cooling is provided by transferring heat to the environment, which reduces the heat pick-up by the cooling fluid and maintains a larger temperature difference between hot and cold streams, which improves thermal efficiency. Similarly, when the cold stream is flowing internal to the tube bank, the cooling stream temperature may be reduced by heat exchange with the environment through the return manifolds when sufficient heat has been added by the hot stream (flowing inside the shell external to the tube bank) for the cooling flow to exceed the environment temperature.

Figure 6:
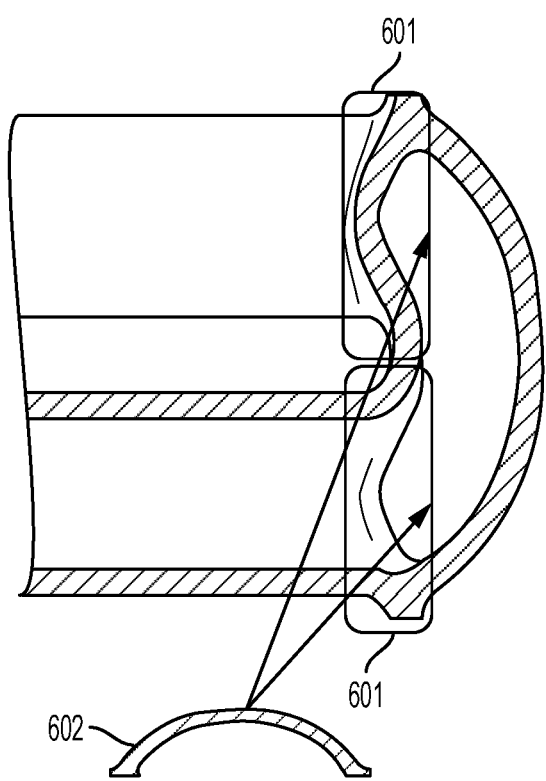
FIG. 6 shows an embodiment of the invention having an omega-shaped hairpin as a 360° features around the tube-manifold intersection.
Figure 7:
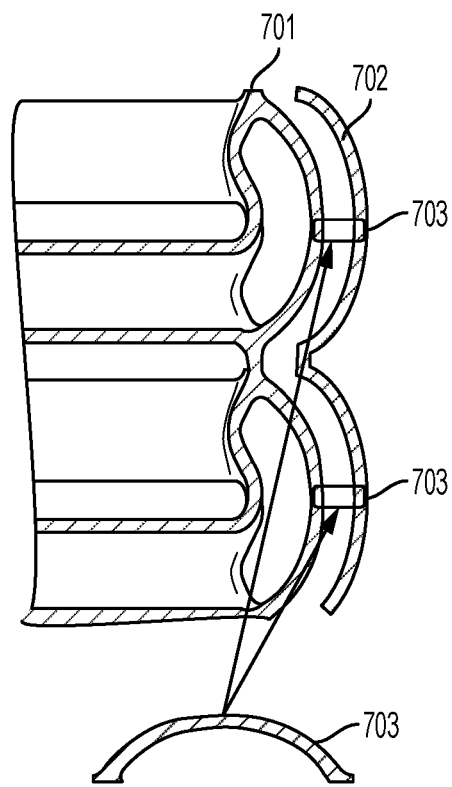
FIG. 7 shows an embodiment of the invention having an omega-shaped hairpin as a compliant feature between the manifold and shell wall.

In one aspect of the invention, the internal return manifolds add thermal compliance into the heat exchanger. High-temperature heat exchange applications for aircraft engines may result in excess of 1000° F. temperature differences across walls. These temperature differentials result in severe thermal stresses that must be alleviated for the component to possess sufficient low-cycle fatigue strength to survive aviation thermal cycling. Thermal stresses are primarily attenuated through compliant structures that flex to accommodate thermal expansion. Integral return manifolds provide additional opportunities for thermal compliance. First, at the tube-manifold interface thermal compliance can be enhanced by providing an hairpin style expansion feature 601, 602. FIG. 6. Other shapes, such as a linear spring or bellows may are also possible for an expansion feature. Second, the tube return manifold 701 can be included within the heat exchanger shell envelop 702 and providing thermal compliance features 703. The thermal compliance features 703 can be hairpin expansion structures or sliding interfaces in the form of tabs, slip joints or post and receiver geometries.

In another aspect of the invention, the use of integral return manifolds enable varying tube counts and pitches throughout tube bank. These variable tube counts and/or pitches may increase thermal performance and/or packaging. In other words, thermal designs may be optimized by increasing local pressure gradients to maximize the heat transfer coefficient in regions where the stream temperature differences are largest.

In an alternative aspect of the invention, the tube pitch is decreased along the shell flow direction or the tube count is reduced along the shell flow direction at a constant pitch to accelerate the cold shell stream from tube pass to pass. The external shell of the HX body can be tapered appropriately to match the decreasing tube count, maintaining a constant tube to shell inner wall gap size to avoid large tube bank bypass flows. Varying tube counts may also be implemented to address HX envelop and packaging constraints in crowed environments. Tube counts and tube pitches may be used in concert to optimize the local pressure gradients and heat transfer coefficients. Tube lengths may additionally varied to prevent tube count and pitches from producing high-aspect ratio shell flow areas that potentially results in shell stream mal-distribution.

Exemplary embodiments of a fluid conduit and method for manufacturing the same are described above in detail. The methods and systems are not limited to the specific embodiments described herein, but rather components of the methods and systems may be utilized independently and separately from other components described herein. For example, the methods and systems described herein may have other industrial and/or consumer application and are not limited to practice in any particular field or industry. Rather, the present invention can be implemented and utilized in connection with many other industries. While the invention has been described in terms of various specific embodiments, those skilled in the art will recognize that the invention can be practiced with modification within the spirit and scope of the claims.

What is claimed is:

1. A heat exchanger comprising:
   an outer shell portion;
   at least two first supply tubes within the outer shell portion;
   at least two first return tubes within the outer shell portion; and
   a return manifold that has an integrally and seamlessly formed curved interface with the at least two first supply tubes and the at least two first return tubes, the integrally and seamlessly formed curved interface having been formed by additively manufacturing a single integrally formed component that comprises: the at least two first supply tubes, the at least two first return tubes, and the return manifold;
   wherein the integrally and seamlessly formed curved interface with the at least two first supply tubes comprises the at least two first supply tubes integrally and seamlessly transitioning to an impingement region of the return manifold that allows fluid from the at least two first supply tubes to mix before flowing into the at least two first return tubes, and wherein:
   the integrally and seamlessly formed curved interface with the at least two first supply tubes comprises the at least two first supply tubes having a tapered interface with the return manifold, the tapered interface comprising an integrally and seamlessly formed narrowing of the at least two first supply tubes transitioning to the curved interface with the return manifold, and/or
   the integrally and seamlessly formed curved interface with the at least two first return tubes comprises the at least two first return tubes having a tapered interface with the return manifold, the tapered interface comprising an integrally and seamlessly formed widening of the at least two first return tubes transitioning to the curved interface with the return manifold.

2. The heat exchanger of claim 1, further comprising a bank of tubes within the outer shell portion comprising at least two second supply tubes and at least two second return tubes, and a second return manifold with the at least two second supply tubes and the at least two second return tubes that allows fluid from the at least two second supply tubes to mix before flowing into the at least two second return tubes.

3. The heat exchanger of claim 1, wherein the at least two first supply tubes include at least one embedded flow constriction structure within an interior of an outlet of the at least two first supply tubes.

4. The heat exchanger of claim 1, further comprising at least one fin structure within the return manifold.

5. The heat exchanger of claim 1, further comprising at least one ridge structure within the return manifold.

6. The heat exchanger of claim 1, further comprising at least one lattice structure within the return manifold.

7. The heat exchanger of claim 1, further comprising two or more pin structures within the return manifold.

8. The heat exchanger of claim 1, further comprising a thermal expansion feature between the return manifold and at least one of the at least two first supply tubes and the at least two first return tubes.

9. A heat exchanger comprising:
   an outer shell portion;
   at least two first supply tubes within the outer shell portion;
   at least two first return tubes within the outer shell portion; and
   a return manifold comprising an integrally and seamlessly formed curved interface with the at least two first supply tubes and the at least two first return tubes, the integrally and seamlessly formed curved interface having been integrally and seamlessly formed by additively manufacturing a single integrally formed component that comprises: the at least two first supply tubes, the at least two first return tubes, and the return manifold,
   wherein the integrally and seamlessly formed curved interface with the at least two first supply tubes comprises the at least two first supply tubes integrally and seamlessly transitioning to an impingement region of the return manifold that allows fluid from the at least two first supply tubes to mix before flowing into the at least two first return tubes, and wherein the heat exchanger comprises a flow restriction within or proximate to the return manifold, and wherein:
   the curved interface is integrally and seamlessly formed with the at least two first supply tubes and comprises the at least two first supply tubes having a tapered interface with the return manifold, the tapered interface comprising an integrally and seamlessly formed narrowing of the at least two first supply tubes transitioning to the curved interface with the return manifold, and/or the curved interface is integrally and seamlessly formed with the at least two first return tubes and comprises the at least two first return tubes having a tapered interface with the return manifold, the tapered interface comprising an integrally and seamlessly formed widening of the at least two first return tubes transitioning to the curved interface with the return manifold.

10. The heat exchanger of claim 9, further comprising a bank of tubes within the outer shell portion comprising at least two second supply tubes and at least two second return tubes, and a second return manifold with the at least two second supply tubes and the at least two second return tubes that allows fluid from the at least two second supply tubes to mix before flowing into the at least two second return tubes.

11. The heat exchanger of claim 10, further comprising:
at least one lattice structure within the return manifold; and
a thermal expansion feature between the return manifold and at least one of the at least two first supply tubes and the at least two first return tubes,
wherein the curved interface comprises the at least two first supply tubes having a tapered interface with the return manifold, the tapered interface comprising a narrowing of the at least two first supply tubes transitioning to the curved interface with the return manifold,
wherein the curved interface comprises the at least two first return tubes having a tapered interface with the return manifold, the tapered interface comprising a widening of the at least two first supply tubes transitioning to the curved interface with the return manifold, and
wherein the at least two first supply tubes include at least one embedded flow constriction structure within the interior of an outlet of the at least two first supply tubes.

12. The heat exchanger of claim 10, further comprising a thermal expansion feature between the return manifold and at least one of the at least two first supply tubes and the at least two first return tubes.

13. The heat exchanger of claim 1, wherein the widening of the at least two first return tubes transitioning to the curved interrace with the return manifold comprises a portion with an expanding bell-mouth shape.

14. The heat exchanger of claim 13, wherein the at least two first return tubes further comprise at least one internal flow constriction feature within the portion with the expanding bell-mouth shape.

15. The heat exchanger of claim 8, wherein the thermal expansion feature comprises at least one of a hairpin, a linear spring, and a bellows.

16. The heat exchanger of claim 8, wherein the thermal expansion feature comprises at least one of a tab, a slip joint, and a post.

17. The heat exchanger of claim 1, wherein the outer shell portion is tapered to maintain a constant gap between the outer shell portion and both the at least two first supply tubes and the at least two first return tubes.

18. The heat exchanger of claim 9, wherein the seamless widening of the at least two first return tubes transitioning to the curved interface with the return manifold comprises a portion with an expanding bell-mouth shape.

19. The heat exchanger of claim 18, wherein the at least two first return tubes comprise at least one internal flow constriction feature within the portion with the expanding bell-mouth shape.

* * * * *